United States Patent
Naito et al.

(10) Patent No.: US 9,734,953 B2
(45) Date of Patent: Aug. 15, 2017

(54) CARBON PASTE AND SOLID ELECTROLYTIC CAPACITOR ELEMENT

(71) Applicant: SHOWA DENKO K.K., Tokyo (JP)

(72) Inventors: Kazumi Naito, Tokyo (JP); Shoji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 132 days.

(21) Appl. No.: 14/650,617

(22) PCT Filed: Sep. 24, 2013

(86) PCT No.: PCT/JP2013/005648
§ 371 (c)(1),
(2) Date: Jun. 9, 2015

(87) PCT Pub. No.: WO2014/091647
PCT Pub. Date: Jun. 19, 2014

(65) Prior Publication Data
US 2015/0371785 A1 Dec. 24, 2015

(30) Foreign Application Priority Data
Dec. 11, 2012 (JP) ................................ 2012-270032

(51) Int. Cl.
| H01G 9/025 | (2006.01) |
| C25D 9/02 | (2006.01) |
| C25D 11/02 | (2006.01) |
| H01G 9/00 | (2006.01) |
| H01G 9/052 | (2006.01) |
| H01G 9/07 | (2006.01) |
| H01G 9/012 | (2006.01) |
| H01G 9/042 | (2006.01) |
| H01G 9/15 | (2006.01) |

(52) U.S. Cl.
CPC ............. *H01G 9/025* (2013.01); *C25D 9/02* (2013.01); *C25D 11/02* (2013.01); *H01G 9/0032* (2013.01); *H01G 9/012* (2013.01); *H01G 9/0425* (2013.01); *H01G 9/052* (2013.01); *H01G 9/07* (2013.01); *H01G 9/0036* (2013.01); *H01G 9/15* (2013.01)

(58) Field of Classification Search
None
See application file for complete search history.

(56) References Cited

U.S. PATENT DOCUMENTS

| 6,391,379 | B1 | 5/2002 | Lessner et al. | |
| 2005/0219802 | A1* | 10/2005 | Kobayashi | H01G 9/0032 361/523 |
| 2008/0193767 | A1* | 8/2008 | Lee | B32B 5/16 428/408 |
| 2012/0171574 | A1* | 7/2012 | Zhamu | H01M 4/13 429/300 |
| 2013/0052522 | A1* | 2/2013 | Inoue | H01M 4/587 429/188 |
| 2013/0052526 | A1* | 2/2013 | Momo | H01M 4/587 429/211 |
| 2013/0087446 | A1* | 4/2013 | Zhamu | B82Y 40/00 204/157.43 |
| 2013/0266859 | A1* | 10/2013 | Todoriki | H01M 4/625 429/211 |
| 2014/0127568 | A1* | 5/2014 | Kawakami | H01M 4/1393 429/211 |

FOREIGN PATENT DOCUMENTS

| JP | 56-70065 A | 6/1981 |
| JP | 59-179672 A | 10/1984 |
| JP | 2-166715 A | 6/1990 |
| JP | 2001-284182 A | 10/2001 |
| JP | 2002-524868 A | 8/2002 |
| JP | 2007-116028 A | 5/2007 |
| JP | 2008-27998 A | 2/2008 |

OTHER PUBLICATIONS

JPH02-166715 machine translation.*
Communication completed Aug. 4, 2016 from the European Patent Office in counterpart European application No. 13 86 2755.
International Search Report for PCT/JP2013/005648 dated Dec. 24, 2013.

* cited by examiner

*Primary Examiner* — Dion R Ferguson
(74) *Attorney, Agent, or Firm* — Sughrue Mion, PLLC

(57) ABSTRACT

A carbon paste including a carbon powder, a resin, and an oxygen releasing oxidizer. The amount of the oxidizer is 3 to 30 parts by mass based on 100 parts by mass of the total amount of the carbon powder and the resin. A solid electrolytic capacitor element is prepared by a method which includes making a valve-action metal powder sintered to obtain an anode body, electrolytically oxidizing a surface of the anode body to chemically convert the surface into a dielectric layer, electrolytic polymerization to form a semiconductor layer of an electro conductive polymer on the dielectric layer, applying the carbon paste onto the semiconductor layer, and drying and hardening the carbon paste to form a carbon layer.

13 Claims, No Drawings

CARBON PASTE AND SOLID ELECTROLYTIC CAPACITOR ELEMENT

CROSS REFERENCE TO RELATED APPLICATIONS

This application is a National Stage of International Application No. PCT/JP2013/005648 filed Sep. 24, 2013, claiming priority based on Japanese Patent Application No. 2012-270032 filed Dec. 11, 2012, the contents of all of which are incorporated herein by reference in their entirety.

TECHNICAL FIELD

The present invention relates to a carbon paste and a solid electrolytic capacitor element. More specifically, the present invention relates to a solid electrolytic capacitor element showing a smaller increase in leakage current during being left for a long time without being encapsulated and relates to a carbon paste for preparing the capacitor element.

BACKGROUND ART

A solid electrolytic capacitor element is prepared, for example, by electrolytic oxidation of a sintered compact of a valve-action metal powder, such as tantalum, niobium, tungsten or the like, in an aqueous solution of an electrolyte such as phosphoric acid to chemically convert the surface of the sintered compact into a dielectric layer of a metal oxide; electrolytic polymerization to form a semiconductor layer on the dielectric layer; and forming a carbon layer on the semiconductor layer. The carbon layer is usually formed from a carbon paste. For example, the carbon paste as described in Patent Document 1 is a paste composed of carbon particles and catechol or pyrogallol. Patent Document 2 discloses a carbon aqueous solution or a carbon paste prepared by mixing carbon and an aromatic compound having a sulfonic acid group.

CITATION LIST

Patent Literatures

Patent Document 1: JP 2001-284182 A
Patent Document 2: JP 2008-027998 A

SUMMARY OF THE INVENTION

Problems to be Resolved by the Invention

A solid electrolytic capacitor is produced by encapsulating a solid electrolytic capacitor element with, for example, a resin. If a solid electrolytic capacitor element is left to stand without being encapsulated with a resin or the like, a leakage current (hereinafter may be abbreviated to LC) may increase. The LC can be reduced to a certain degree by subjecting the solid electrolytic capacitor element to resin encapsulation and then to restoration treatment such as aging or the like. If the LC is considerably high, however, the reduction of the LC to a certain level or lower is difficult even if the restoration treatment is performed.

In addition, the period of time from the completion of the production of solid electrolytic capacitor elements to the start of the resin encapsulation varies between production lots in some cases. In such a case, a difference in the time of leaving the solid electrolytic capacitor elements may cause a variation in the LCs of the solid electrolytic capacitors. In particular, in solid electrolytic capacitors comprising anode bodies mainly made of tungsten, the variation in LC due to the difference in the time of leaving is significantly large.

It is an object of the present invention to provide a solid electrolytic capacitor element showing a smaller increase in leakage current during being left for a long time without being encapsulated and a carbon paste for preparing the capacitor element.

Means for Solving the Problem

The present inventors have diligently studied for achieving the above-mentioned object and, as a result, have accomplished the invention including the following aspects.
(1) A carbon paste comprising a carbon powder, a resin, a solvent, and an oxidizer having an oxygen releasing function, wherein the amount of the oxidizer is 3 to 30 parts by mass based on 100 parts by mass of the total amount of the carbon powder and the resin.
(2) The carbon paste according to aspect (1), wherein the oxidizer is at least one selected from the group consisting of manganese(VII) compounds, chromium(VI) compounds, halogen acid compounds, persulfuric acid compounds, and organic peroxides.
(3) The carbon paste according to aspect (1), wherein the oxidizer is a persulfuric acid compound.
(4) The carbon paste according to any one of aspects (1) to (3), wherein the solvent comprises 80% by mass or more of water.
(5) A solid electrolytic capacitor element at least comprising:
an anode body;
a dielectric layer formed by chemically converting a surface of the anode body;
a semiconductor layer laminated on the dielectric layer; and
a carbon layer formed on the semiconductor layer by drying and hardening a carbon paste according to any one of aspects (1) to (4).
(6) The solid electrolytic capacitor element according to aspect (5), wherein the anode body is a sintered compact of a tungsten powder.
(7) A method for producing a solid electrolytic capacitor element, the method comprising:
making a valve-action metal powder sintered to obtain an anode body;
electrolytically oxidizing a surface of the anode body to chemically convert the surface into a dielectric layer;
electrolytic polymerization to form a semiconductor layer of an electro conductive polymer on the dielectric layer;
applying the carbon paste according to any one of aspects (1) to (4) onto the semiconductor layer; and
drying and hardening the carbon paste to form a carbon layer.

Advantageous Effects of the Invention

Using the carbon paste of the present invention to form a carbon layer on a semiconductor layer can give a solid electrolytic capacitor element showing a smaller increase in leakage current during being left for a long time without being encapsulated. In addition, the use of such solid electrolytic capacitor elements reduces the variation in the leakage currents of solid electrolytic capacitors from different production lots.

EMBODIMENT FOR CARRYING OUT THE INVENTION

A carbon paste according to an embodiment of the present invention at least comprises a carbon powder, a resin, and an oxidizer. The carbon paste can optionally comprise a solvent depending on the properties of the resin and other components.

Examples of the carbon powder comprised in the carbon paste of the present invention include electro conductive carbon powders. As the electro conductive carbon powder, a mixture of a graphite powder and a carbon black at an appropriate ratio is preferably used. The types and the particle size distributions of the graphite powder and the carbon black are appropriately determined depending on the purpose of the solid electrolytic capacitor for which the carbon paste is used. The carbon powder may further contain carbon nanotubes, fullerene, or acicular carbon.

As the comprised in the carbon paste of the present invention, mentioned are hydrophilic resins or the like. Examples thereof include cellulose, acrylic resins, vinyl alcohol resins, ethylene oxide resins, carboxyvinyl resins, hydroxycellulose resins, modified alkyd resins, water-soluble phenolic resins, and water-soluble amide-imide resins, and derivatives thereof. When the resin is a liquid, the solvent is not necessarily comprised in the paste, but may be used for controlling the paste viscosity. When the resin is a solid, the resin is preferably dissolved or dispersed in a solvent. Among these resins, cellulose-based polymers or acrylic based polymers are preferred from the viewpoint of easiness of handling.

Examples of the solvent used in the present invention include aqueous solvents and non-aqueous solvents such as toluene, cyclohexane, methyl ethyl ketone and the like. The solvent used in the present invention is preferably one that dissolves an oxidizer having an oxygen releasing function. Since an oxidizer having an oxygen releasing function is usually readily dissolved in an aqueous solvent, the solvent preferably comprises 80% by mass or more of water, more preferably 90% by mass or more of water, most preferably 95% by mass or more of water. A paste comprising a solvent comprising 80% by mass or more of water may be called a water-soluble carbon paste.

The oxidizer used in the carbon paste of the present invention has a function of releasing oxygen. The oxygen releasing oxidizer is preferably at least one selected from the group consisting of manganese(VII) compounds, chromium (VI) compounds, halogen acid compounds, persulfuric acid compounds, and organic peroxides. Examples of the oxidizers include manganese(VII) compounds such as permanganates or the like; chromium(VI) compounds such as chromium trioxide, chromates, dichromates or the like; halogen acid compounds such as perchloric acid, chlorous acid, and hydrochlorous acid and salts thereof; organic acid peroxides such as peracetic acid, and perbenzoic acid, and salts or derivatives thereof; and persulfuric acid compounds such as persulfuric acid and salts thereof. Among these oxidizers, persulfuric acid compounds, such as ammonium persulfate, potassium persulfate, and potassium hydrogen persulfate, are preferred from the viewpoint of easiness of handling, stability as an oxidizer, and high solubility in water. These oxidizers may be used alone or in combination of two or more thereof.

The amount of the oxidizer is preferably 3 to 30 parts by mass, more preferably 5 to 20 parts by mass, based on 100 parts by mass of the total amount of the carbon powder and the resin. A too small amount of the oxidizer tends to wane the effect of preventing the increase in LC during leaving a solid electrolytic capacitor element for several to several tens of days without encapsulating. While a too large amount of the oxidizer tends to reduce the electric conductivity of the hardened product of the carbon paste.

The carbon paste of the present invention may further comprise accessory components, such as a dispersing agent, a pH adjuster, and a hardening agent.

A solid electrolytic capacitor element according to an embodiment of the present invention at least comprises an anode body, a dielectric layer formed by chemically converting a surface of the anode body, a semiconductor layer laminated on the dielectric layer, and a carbon layer laminated on the semiconductor layer.

The anode body is produced from a valve-action metal or an electro conductive oxide thereof. Examples of the valve-action metal include aluminum, tantalum, niobium, tungsten and the like. The anode body is preferably porous for increasing the area of the dielectric layer. A porous anode body can be prepared by, for example, sintering a raw material powder of a valve-action metal or an electro conductive oxide thereof. The raw material powder preferably has a 50% particle diameter (D50) of 0.1 to 1 µm, more preferably 0.1 to 0.7 µm, most preferably 0.1 to 0.3 µm, in volumetric basis accumulated particle size distribution. The raw material powder may be a granulated powder. The granulated powder can be produced by, for example, sintering a raw material powder of a non-granulated valve-action metal or its electro conductive oxide and pulverizing the resulting sintered compact. The granulated powder may be produced by resintering a granulated powder and pulverizing the resintered compact. The granulated powder preferably has a 50% particle diameter (D50) of 20 to 200 µm, more preferably 26 to 180 µm, in volumetric basis accumulated particle size distribution.

The valve-action metal powder, in particular, a tungsten powder, preferably contains silicon, boron, phosphorus, oxygen, and/or nitrogen. These elements may be added to the metal powder by any process. For example, a silicon source such as a silicon powder, a boron source such as a boric acid, a phosphorus source such as a phosphoric acid, an oxygen source such as an oxygen gas, and/or a nitrogen source such as a nitrogen gas is added or introduced in the process of producing a granulated powder from a tungsten bulk powder.

The sintered compact can be obtained by compressing a raw material powder into a compact and firing the compact in a furnace. A binder may be compounded to the raw material powder for easily performing the pressure forming. Various conditions, such as the amount of the powder and the forming apparatus, can be appropriately set such that desired compact density and other factors are achieved. When the raw material powder is compressed, an anode lead wire can be embedded and planted in the compact and can be used as the terminal of the anode body. The anode lead wire can be a wire of a metal such as tungsten, tantalum, niobium or the like. Alternatively, an anode lead wire may be connected to a sintered compact by welding. Instead of the metal wire, a metal plate or metal foil may be embedded in and connected to the sintered compact.

The chemical conversion treatment can be performed in accordance with a conventional procedure. The chemical conversion treatment is performed by, for example, immersing an anode body in an electrolytic solution comprising an electrolyte, such as nitric acid, sulfuric acid, phosphoric acid, oxalic acid, adipic acid or the like, and optionally an oxygen supplier, such as hydrogen peroxide, ozone or the like which are dissolved, and applying a voltage thereto. The voltage is applied between the anode body (positive electrode) and a counter electrode (negative electrode). Electric current can enter the anode body through the embedded anode lead wire. The chemical conversion treatment may be repeated multiple times. The surface of the sintered compact can be chemically converted into a dielectric layer by this voltage application.

After the chemical conversion treatment, the sintered compact is rinsed with pure water for removing the chemical conversion solution as thoroughly as possible. After the rinsing with pure water, high-temperature drying is preferably performed at a temperature not lower than the boiling point of water, preferably at 160° C. or more. The upper limit of the temperature for drying is preferably 250° C. The drying is more preferably performed at a temperature of not less than 105° C. and less than 160° C. and then at a temperature of not less than 160° C. and not more than 230° C. The drying at such temperatures increases the capacitance in the low-frequency region and the high-frequency region by approximately 10-15%. The drying time may be in any range that can maintain the stability of the dielectric layer and is preferably for 10 minutes to 2 hours, more preferably for 20 to 60 minutes. After the drying, the chemical conversion treatment may be performed again. The second chemical conversion treatment can be performed under the same condition as that of the first chemical conversion treatment. After the second chemical conversion treatment, rinsing with pure water and drying can be performed as indicated above.

A semiconductor layer is then formed on the dielectric layer. The semiconductor layer may be one that is used without any limitation in known solid electrolytic capacitor elements. Semiconductors are classified into inorganic semiconductors and organic semiconductors. Examples of the inorganic semiconductor include molybdenum dioxide, tungsten dioxide, lead dioxide, manganese dioxide or the like. Examples of the organic semiconductor include electro conductive polymers, such as tetracyanoquinodimethane (TCNQ) complex salts, polypyrrole and its derivatives, polythiophene and its derivatives (e.g., polymers of 3,4-ethylenedioxythiophene), polysulfide and its derivatives, polyfuran and its derivatives, polyaniline and its derivatives or the like. The electro conductive polymers can be prepared by, for example, electrolytic polymerization.

A carbon layer is formed on the semiconductor layer. The carbon layer is formed by drying and hardening the above-described carbon paste according to the present invention. The carbon layer can be formed by applying a carbon paste to a predetermined portion on the semiconductor layer and then drying and hardening the carbon paste.

The applying of the carbon paste can be performed by various processes according to the shape of the anode body. Specifically, the carbon paste can be applied onto the semiconductor layer by immersing the anode body equipped with the semiconductor layer in a carbon paste bath or by transferring the carbon paste adhered on a base material onto the semiconductor layer. Since the carbon paste according to the present invention sometimes separates into two layers, a solid layer and a liquid layer, the carbon paste is preferably sufficiently stirred and mixed before the applying. As a result, the oxidizer in the carbon layer formed on the semiconductor layer can have a uniform concentration distribution.

The applied carbon paste is dried at a temperature not lower than the boiling point of the solvent, preferably at 100° C. or more. The upper limit of the temperature in the drying is preferably 160° C. The drying is more preferably performed at a temperature of not less than 105° C. and less than 150° C. The drying at such a temperature can appropriately remove the solvent and can form a homogeneous carbon layer. The drying time may be in any range that allows the solvent to be removed and is preferably 5 minutes to 2 hours, more preferably 15 to 30 minutes. The drying may be performed in air or in a flow of an inert gas such as argon gas or a nitrogen gas. Alternatively, the drying can be completed at a lower temperature or for a shorter period of time by performing the drying at reduced pressure down to approximately 10 kPa. The drying in air at an atmospheric pressure is preferred from the standpoint of cost, considering industrial mass production. After the drying, chemical conversion treatment may be performed again. The third chemical conversion treatment can be performed under the same condition as that of the first chemical conversion treatment. After the third chemical conversion treatment, rinsing with pure water and drying can be performed as indicated above. The conditions for the drying and hardening can be appropriately set by combining the above-mentioned conditions.

A metal layer can be optionally formed on the carbon layer. The metal layer can be formed, for example, by application of a paste comprising an electro conductive metal such as silver or by plating of an electro conductive metal. The thus-formed carbon layer or the combination of the carbon layer and the metal layer is called an electrode layer.

As a result, a solid electrolytic capacitor element can be obtained.

The electrode layer is electrically connected to a cathode lead. A part of the cathode lead is exposed to the outside of the exterior of an electrolytic capacitor and serves as the external terminal of the cathode. The anode body is electrically connected to an anode lead via an anode lead wire. A part of the anode lead is exposed to the outside of the exterior of the electrolytic capacitor and serves as the external terminal of the anode. The cathode lead and the anode lead can be attached with usual lead frames. Subsequently, the exterior is formed by encapsulating with, for example, a resin to prepare a solid electrolytic capacitor. The thus-prepared solid electrolytic capacitor can be subjected to aging treatment as desired. The resulting solid electrolytic capacitor is installed on a variety of types of electric circuits or electronic circuits and can be used.

EXAMPLES

The present invention will now be more specifically described by examples. These examples are merely illustrative and are not intended to limit the invention.

Each property was measured as follows.
(Capacitance)

A solid electrolytic capacitor element was dried in air of 100° C. for 5 minutes with a thermostatic drier. Immediately after the drying, the leads wired to an LCR measuring instrument (manufactured by Agilent Technologies, Inc.) were brought into contact with the electrode layer of the capacitor element and the lead wire embedded in the capacitor element to measure the capacitance at 120 Hz by applying a bias voltage of 2.5 V with the LCR measuring instrument. The average value of the measured values of randomly selected 40 capacitor elements was calculated.
(Leakage Current)

A voltage of 2.5 V was applied to a capacitor element at room temperature. At the time of 30 seconds after the start of the voltage application, the current value (leakage current) in the circuit ranging from the plus terminal of the power supply to the minus terminal of the power supply through the anode lead wire and the electrode layer of the capacitor element was measured.

The average value of the measured values of randomly selected 40 capacitor elements was calculated.

(Elementary Analysis)

The elemental content in the anode body was determined by ICP emission spectrometry. The nitrogen amount and the oxygen amount in the anode body were determined respectively by a thermal conductivity method and infrared absorption spectrophotometry with an oxygen nitrogen analyzer (TC 600, manufactured by LECO Corporation). The average value of randomly selected two anode bodies was calculated.

(Particle Diameter)

The particle size distribution was measured by a laser diffraction scattering method with HRA 9320-X100 manufactured by Microtrac, Inc. The 50% particle diameter (D50) in accumulated particle size distribution on the volume basis was determined.

(Surface Resistivity)

The carbon paste was applied onto a glass substrate at a thickness of 500 μm by a doctor blade method and was dried and hardened in air of 105° C. for 120 hours to prepare a monolayer film. The surface resistivity of the film was measured.

Production Example 1

A tungsten powder having a 50% particle diameter of 0.6 μm was heated in vacuum at 1460° C. for 30 minutes. After cooling to room temperature, the resulting massive product was crushed with a hammer mill to produce granulated powder A having a 50% particle diameter of 112 μm (particle size distribution range: 26 to 180 μm).

Production Example 2

A tungsten powder having a 50% particle diameter of 0.6 μm was heated in vacuum at 1460° C. for 30 minutes. At 150° C. during the cooling to room temperature, a nitrogen gas containing 1000 ppm by volume of oxygen was introduced. After cooling to room temperature, the resulting massive product was crushed with a hammer mill to produce granulated powder B having a 50% particle diameter of 112 μm (particle size distribution range: 26 to 180 μm).

Production Example 3

Silicon was added to and mixed with a tungsten powder having a 50% particle diameter of 0.6 μm, and the resulting mixture was heated in vacuum at 1460° C. for 30 minutes. After cooling to room temperature, the resulting massive product was crushed with a hammer mill to produce granulated powder C having a 50% particle diameter of 112 μm (particle size distribution range: 26 to 180 μm).

Production Example 4

Silicon was added to and mixed with a tungsten powder having a 50% particle diameter of 0.6 μm, and the resulting mixture was heated in vacuum at 1460° C. for 30 minutes. At 150° C. during the cooling to room temperature, a nitrogen gas containing 1000 ppm by volume of oxygen was introduced. After cooling to room temperature, the resulting massive product was crushed with a hammer mill to produce granulated powder D having a 50% particle diameter of 112 μm (particle size distribution range: 26 to 180 μm).

Example 1

A paste comprising a carbon powder and a cellulose resin, the paste is composed of 27 parts by mass of solid content comprising 90% by mass of graphite, 7% by mass of carbon black and 3% by mass of the cellulose resin and 73 parts by mass of water, trade name: Banihite T-602, manufactured by Nippon Graphite Industries, Inc.] was prepared.

An aqueous solution of ammonium persulfate was prepared by dissolving 3 g of ammonium persulfate in 50 mL of water. The aqueous solution of ammonium persulfate was mixed with 370 g of the paste such that the amount of ammonium persulfate was 3 parts by mass based on 100 parts by mass of the solid content in the paste to prepare carbon paste A1. Carbon paste A1 had a surface resistivity of 5±2 Ω/sq.

[Production of Sintered Compact]

Granulated powder A was compressed to produce a compact. During the compression, a tantalum wire (lead wire) having a diameter of 0.29 mm was planted. The compact was placed in a vacuum firing furnace and was fired at 1550° C. for 20 minutes to produce 500 sintered compacts of 1.0 mm×1.5 mm×4.5 mm (the lead wire was embedded in the surface of 1.0 mm×1.5 mm of each sintered compact). The mass of each sintered compact excluding the mass of the lead wire was 62±2 mg. In the resulting anode bodies, the total amount of impurity elements (elements other than tungsten, oxygen, nitrogen, boron, phosphorus, and silicon) was not higher than 1000 ppm by mass.

[Formation of Dielectric Layer (Chemical Conversion Treatment)]

i) Electrolytic Oxidation

An aqueous solution of 1% by mass of nitric acid was prepared as a chemical conversion solution. The sintered compacts were immersed in the chemical conversion solution held in a stainless steel container in such a manner that each of the sintered compact was completely immersed in the chemical conversion solution. A voltage of 15 V was applied by connecting the lead wire to a positive pole and the container to a negative pole in the chemical conversion solution at a solution temperature of 20° C. for 8 hours.

ii) Rinse with Water and Drying

The sintered compacts were then rinsed with pure water to remove the chemical conversion solution in the pores of the sintered compacts. The sintered compacts were then immersed in ethanol and were stirred to remove substantially all of the water attached to the surfaces (including the pore surfaces). The sintered compacts were pulled out from the ethanol and were dried at 190° C. for 30 minutes. The surfaces of the sintered compacts had been each chemically converted into a dielectric layer.

[Lamination of Semiconductor Layer]

i) Immersion Step

The sintered compacts each equipped with the dielectric layer were immersed in an ethanol solution of 10% by mass of ethylenedioxythiophene (hereinafter abbreviated to EDOT), were then pulled out, and were dried at room temperature. The sintered compacts were then immersed in an aqueous solution of 10% by mass of iron toluenesulfonate, were then pulled out, and were subjected to a reaction at 60° C. for 10 minutes. A series of this procedure was repeated three times to give treated bodies.

ii) Electrolytic Polymerization Step

The treated bodies were immersed in an ethanol solution of 10% by mass EDOT and were then pulled out from the ethanol solution. The treated bodies were then immersed in a polymerization solution at a solution temperature of 20° C. stored in a stainless steel (SUS303) container in such a manner that the anode leads were not immersed in the solution and were electrolytic polymerized at 60 μA for each treated body for 60 minutes. The polymerization solution was prepared by dissolving supersaturated EDOT and 3% by mass of anthraquinonesulfonic acid in a solvent mixture of 70 parts by mass of water and 30 parts by mass of ethylene glycol. After the electrolytic polymerization, the treated bodies were pulled out from the polymerization solution, were rinsed with pure water, were rinsed with ethanol, and were then dried at 80° C. As a result, a semiconductor layer of an electro conductive polymer was laminated on the dielectric layer.

iii) Post-Chemical Conversion Step

An aqueous solution of 1% by mass of nitric acid was prepared as a chemical conversion solution. The treated bodies each formed with the semiconductor layer were immersed in the chemical conversion solution. A voltage of 9 V was applied in the chemical conversion solution of a solution temperature of 20° C. for 15 minutes. The treated bodies were pulled out from the chemical conversion solution, rinsed with pure water and rinsed with ethanol, and then dried.

The above-described immersion step, electrolytic polymerization step, and post-chemical conversion step were further repeated five times (six times in total). The electrolytic polymerization in the second and third times was performed at 70 µA for each treated body, and that in the fourth to sixth times was performed at 80 µA for each treated body.

[Lamination of Electrode Layer]

Carbon paste A1 was applied to a predetermined portion of each treated body equipped with the semiconductor layer and was dried in air of 105° C. for 30 minutes with a thermostatic drier to form a carbon layer. A silver paste was applied onto the carbon layer and was dried to form a silver layer. Thus, 128 solid electrolytic capacitor elements were produced.

The capacitance and leakage current (in the table, shown as "initial LC") of each solid electrolytic capacitor element were measured.

The solid electrolytic capacitor elements were left to stand at 23° C. in air with a humidity of 40% for 30 days. The leakage current (in the table, shown as "after-leaving LC") was then measured again. The results are shown in Table 1.

Examples 2 to 7

Carbon pastes A2 to A7 were prepared in the same manner as in Example 1 except that the amounts of ammonium persulfate were changed as shown in Table 1. The carbon pastes A2 to A7 each had a surface resistivity of 5±2 Ω/sq.

Solid electrolytic capacitor elements were produced in the same manner as in Example 1 except that carbon pastes A2 to A7 were used instead of carbon paste A1. The capacitance, initial LC, and after-leaving LC of the capacitor elements were measured respectively. The results are shown in Table 1.

Comparative Examples 1 to 3

Carbon pastes A8 to A10 were prepared in the same manner as in Example 1 except that the amounts of ammonium persulfate were changed as shown in Table 1. Carbon pastes A8 and A9 each had a surface resistivity of 5±2 Ω/sq, and carbon paste A10 had a surface resistivity of higher than 15 Ω/sq.

Solid electrolytic capacitor elements were produced in the same manner as in Example 1 except that carbon pastes A8 to A9 were used instead of carbon paste A1. The capacitance, initial LC, and after-leaving LC of the capacitor elements were measured respectively. The results are shown in Table 1.

Since it is obvious that the use of carbon paste A10 having a high surface resistivity increases the equivalent series resistance (ESR) at 120 kHz, no capacitor element was produced using carbon paste A10.

Example 8

A solid electrolytic capacitor element was produced in the same manner as in Example 3 except that granulated powder B was used instead of granulated powder A. The capacitance, initial LC, and after-leaving LC of the capacitor element were measured. The anode body contained 1450 ppm by mass of oxygen and 630 ppm by mass of nitrogen. The total amount of impurity elements (elements other than tungsten, oxygen, nitrogen, boron, phosphorus, and silicon) in the anode body was not higher than 1000 ppm by mass. The results are shown in Table 1.

Comparative Example 4

A solid electrolytic capacitor element was produced in the same manner as in Comparative Example 1 except that granulated powder B was used instead of granulated powder A. The capacitance, initial LC, and after-leaving LC of the capacitor element were measured. The anode body contained 1450 ppm by mass of oxygen and 630 ppm by mass of nitrogen. The total amount of impurity elements (elements other than tungsten, oxygen, nitrogen, boron, phosphorus, and silicon) in the anode body was not higher than 1000 ppm by mass. The results are shown in Table 1.

TABLE 1

|  | Example | | | | | |
| --- | --- | --- | --- | --- | --- | --- |
|  | 1 | 2 | 3 | 4 | 5 | 6 |
| Carbon Paste | A1 | A2 | A3 | A4 | A5 | A6 |
| Oxidizer | | | | | | |
| Type | $(NH_4)_2S_2O_8$ | $(NH_4)_2S_2O_8$ | $(NH_4)_2S_2O_8$ | $(NH_4)_2S_2O_8$ | $(NH_4)_2S_2O_8$ | $(NH_4)_2S_2O_8$ |
| [Parts by mass] | 3 | 5 | 10 | 15 | 20 | 25 |
| Surface resistivity [Ω/sq] | 5 ± 2 | 5 ± 2 | 5 ± 2 | 5 ± 2 | 5 ± 2 | 5 ± 2 |
| Granulated Powder | A | A | A | A | A | A |
| Capacitance [µF] | 253 | 246 | 255 | 250 | 246 | 230 |
| Initial LC [µA] | 34 | 36 | 33 | 30 | 35 | 30 |
| After-leaving LC [µA] | 53 | 42 | 37 | 35 | 39 | 43 |

TABLE 1-continued

|  | Example | | Comp. Example | | | |
|---|---|---|---|---|---|---|
|  | 7 | 8 | 1 | 2 | 3 | 4 |
| Carbon Paste | A7 | A3 | A8 | A9 | A10 | A8 |
| Oxidizer |  |  |  |  |  |  |
| Type | $(NH_4)_2S_2O_8$ | $(NH_4)_2S_2O_8$ | $(NH_4)_2S_2O_8$ | $(NH_4)_2S_2O_8$ | $(NH_4)_2S_2O_8$ | $(NH_4)_2S_2O_8$ |
| [Parts by mass] | 30 | 10 | 0 | 2 | 35 | 0 |
| Surface resistivity [Ω/sq] | 5 ± 2 | 5 ± 2 | 5 ± 2 | 5 ± 2 | 15< | 5 ± 2 |
| Granulated Powder | A | B | A | A | — | B |
| Capacitance [µF] | 222 | 259 | 254 | 250 | — | 263 |
| Initial LC [µA] | 28 | 30 | 42 | 40 | — | 33 |
| After-leaving LC [µA] | 44 | 33 | 167 | 160 | — | 171 |

Example 9

A paste comprising a carbon powder and an acrylic resin was prepared using the acrylic resin instead of the cellulose resin in the paste (Banihite T-602) in Example 1. The paste was composed of 27 parts by mass of solid content comprising 88% by mass of graphite, 9% by mass of carbon black and 3% by mass of the acrylic resin and 73 parts by mass of water.

A solution of potassium persulfate was prepared by dissolving 3 g of potassium persulfate in a solvent mixture of 5 mL of ethanol and 45 mL of water. Carbon paste B1 was prepared by mixing 370 g of the paste with the solution of potassium persulfate such that the amount of potassium persulfate was 3 parts by mass based on 100 parts by mass of the solid content in the paste. Carbon paste B1 had a surface resistivity of 7±2 Ω/sq.

A solid electrolytic capacitor element was prepared in the same manner as in Example 1 except that granulated powder C and carbon paste B1 were used instead of granulated powder A and carbon paste A1, respectively. The capacitance, initial LC, and after-leaving LC of the capacitor element were measured. The anode body contained 965 ppm by mass of silicon. The total amount of impurity elements (elements other than tungsten, oxygen, nitrogen, boron, phosphorus, and silicon) in the anode body was not higher than 1000 ppm by mass. The results are shown in Table 2.

Examples 10 to 15

Carbon pastes B2 to B7 were prepared in the same manner as in Example 9 except that the amounts of potassium persulfate were changed as shown in Table 2. Carbon pastes B2 to B7 each had a surface resistivity of 7±2 Ω/sq.

Solid electrolytic capacitor elements were produced in the same manner as in Example 9 except that carbon pastes B2 to B7 were used instead of carbon paste B1. The capacitance, initial LC, and after-leaving LC of the capacitor elements were measured respectively. The results are shown in Table 2.

Comparative Examples 5 to 7

Carbon pastes B8 to B10 were prepared in the same manner as in Example 9 except that the amounts of potassium persulfate were changed as shown in Table 2. Carbon pastes B8 and B9 each had a surface resistivity of 7±2 Ω/sq.

Solid electrolytic capacitor elements were produced in the same manner as in Example 9 except that carbon pastes B8 and B9 were used instead of carbon paste B1. The capacitance, initial LC, and after-leaving LC of the capacitor elements were measured respectively. The results are shown in Table 2.

Carbon paste B10 had a surface resistivity of higher than 24 Ω/sq. Since it is obvious that the use of carbon paste B10 having a high surface resistivity increases the equivalent series resistance (ESR) at 120 kHz, no capacitor element was produced using carbon paste B10.

Example 16

A solid electrolytic capacitor element was produced in the same manner as in Example 11 except that granulated powder D was used instead of granulated powder C. The capacitance, initial LC, and after-leaving LC of the capacitor element were measured. The anode body contained 965 ppm by mass of silicon, 1680 ppm by mass of oxygen, and 710 ppm by mass of nitrogen. The total amount of impurity elements (elements other than tungsten, oxygen, nitrogen, boron, phosphorus, and silicon) in the anode body was not higher than 1000 ppm by mass. The results are shown in Table 2.

Comparative Example 8

A solid electrolytic capacitor element was produced in the same manner as in Comparative Example 5 except that granulated powder D was used instead of granulated powder C. The capacitance, initial LC, and after-leaving LC of the capacitor element were measured. The anode body contained 965 ppm by mass of silicon, 1680 ppm by mass of oxygen, and 710 ppm by mass of nitrogen. The total amount of impurity elements (elements other than tungsten, oxygen, nitrogen, boron, phosphorus, and silicon) in the anode body was not higher than 1000 ppm by mass. The results are shown in Table 2.

TABLE 2

| | Example | | | | | | | | Comp. Example | | | |
|---|---|---|---|---|---|---|---|---|---|---|---|---|
| | 9 | 10 | 11 | 12 | 13 | 14 | 15 | 16 | 5 | 6 | 7 | 8 |
| Carbon Paste | B1 | B2 | B3 | B4 | B5 | B6 | B7 | B3 | B8 | B9 | B10 | B8 |
| Oxidizer | | | | | | | | | | | | |
| Type | $K_2S_2O_8$ | $K_2S_2O_8$ | $K_2S_2O_8$ | $K_2S_2O_8$ | $K_2S_2O_8$ | $K_2S_2O_8$ | $K_2S_2O_8$ | $K_2S_2O_8$ | $K_2S_2O_8$ | $K_2S_2O_8$ | $K_2S_2O_8$ | $K_2S_2O_8$ |
| [Parts by mass] | 3 | 5 | 10 | 15 | 20 | 25 | 30 | 10 | 0 | 2 | 35 | 0 |
| Surface resistivity [Ω/sq] | 7 ± 2 | 7 ± 2 | 7 ± 2 | 7 ± 2 | 7 ± 2 | 7 ± 2 | 7 ± 2 | 7 ± 2 | 7 ± 2 | 7 ± 2 | 24< | 7 ± 2 |
| Granulated Powder | C | C | C | C | C | C | C | D | C | C | — | D |
| Capacitance [μF] | 273 | 277 | 274 | 270 | 275 | 251 | 237 | 285 | 274 | 270 | — | 284 |
| Initial LC [μA] | 21 | 20 | 17 | 24 | 21 | 24 | 22 | 22 | 22 | 24 | — | 23 |
| After-leaving LC [μA] | 35 | 26 | 22 | 28 | 26 | 35 | 37 | 24 | 158 | 150 | — | 148 |

As shown in Tables 1 and 2, solid electrolytic capacitor elements (Examples) prepared using carbon pastes comprising the oxidizer having an oxygen releasing function in an amount of 3 to 30 parts by mass based on 100 parts by mass of the total amount of the carbon powder and the resin show a smaller increase in leakage current during being left for a long time without being encapsulated.

The invention claimed is:

1. A carbon paste comprising a carbon powder, a resin, a solvent, and an oxidizer having an oxygen releasing function, wherein the amount of the oxidizer is 3 to 30 parts by mass based on 100 parts by mass of the total amount of the carbon powder and the resin.

2. The carbon paste according to claim 1, wherein the oxidizer is at least one selected from the group consisting of manganese(VII) compounds, chromium(VI) compounds, halogen acid compounds, persulfuric acid compounds, and organic peroxides.

3. The carbon paste according to claim 1, wherein the oxidizer is a persulfuric acid compound.

4. The carbon paste according to claim 1, wherein the solvent comprises 80% by mass or more of water.

5. A solid electrolytic capacitor element at least comprising:
   an anode body;
   a dielectric layer formed by chemically converting a surface of the anode body;
   a semiconductor layer laminated on the dielectric layer; and
   a carbon layer formed on the semiconductor layer by drying and hardening a carbon paste comprising a carbon powder, a resin, a solvent, and an oxidizer having an oxygen releasing function, wherein the amount of the oxidizer is 3 to 30 parts by mass based on 100 parts by mass of the total amount of the carbon powder and the resin.

6. The solid electrolytic capacitor element according to claim 5, wherein the anode body is a sintered compact of a tungsten powder.

7. The solid electrolytic capacitor element according to claim 5, wherein the oxidizer is at least one selected from the group consisting of manganese(VII) compounds, chromium (VI) compounds, halogen acid compounds, persulfuric acid compounds, and organic peroxides.

8. The solid electrolytic capacitor element according to claim 5, wherein the oxidizer is a persulfuric acid compound.

9. The solid electrolytic capacitor element according to claim 5, wherein the solvent comprises 80% by mass or more of water.

10. A method for producing a solid electrolytic capacitor element, the method comprising:
    making a valve-action metal powder sintered to obtain an anode body;
    electrolytically oxidizing a surface of the anode body to chemically convert the surface into a dielectric layer;
    electrolytic polymerization to form a semiconductor layer of an electro conductive polymer on the dielectric layer;
    applying a carbon paste onto the semiconductor layer, the carbon paste comprising a carbon powder, a resin, a solvent, and an oxidizer having an oxygen releasing function, wherein the amount of the oxidizer is 3 to 30 parts by mass based on 100 parts by mass of the total amount of the carbon powder and the resin; and
    drying and hardening the carbon paste to form a carbon layer.

11. The method according to claim 10, wherein the oxidizer is at least one selected from the group consisting of manganese (VII) compounds, chromium (VI) compounds, halogen acid compounds, persulfuric acid compounds, and organic peroxides.

12. The method according to claim 10, wherein the oxidizer is a persulfuric acid compound.

13. The method according to claim 10, wherein the solvent comprises 80% by mass or more of water.

* * * * *